United States Patent Office 3,845,085
Patented Oct. 29, 1974

3,845,085
Δ[8(9)] STEROIDS OF THE PREGNANE SERIES
Gordon Hanley Phillipps, Wembley, and Peter John May, North Harrow, England, assignors to Glaxo Laboratories Limited
No Drawing. Filed Aug. 10, 1973, Ser. No. 387,488
Claims priority, application Great Britain, Aug. 11, 1972, 37,656/72
Int. Cl. C07c 169/34
U.S. Cl. 260—397.45        8 Claims

ABSTRACT OF THE DISCLOSURE

The specification describes compounds of the general formula

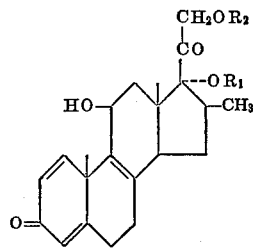

wherein $R_1$ represents an alkanoyl group containing 3 or 4 carbon atoms; and $R_2$ represents a hydrogen atom or an alkanoyl group containing 2, 3 or 4 carbon atoms. The compounds have useful anti-inflammatory activity on either topical or internal administration. The specification also describes processes for the preparation of the compounds as well as pharmaceutical compositions containing the compounds.

---

The present invention is concerned with improvements in or relating to steroid compounds and more particularly with novel Δ[8(9)] steroids of the pregnane series.

Many of the pregnane steroids currently employed in anti-inflammatory therapy are characterised by the presence of a halogen atom, especially a fluorine or chlorine atom, in the 9-position of the steroid molecule. Such 9-halogenated steroids have been of particular value in the effective treatment of inflammatory disorders since it has been found that the introduction of a halogen atom, especially a fluorine or chlorine atom, into the 9-position of a pregnane steroid generally enhances the anti-inflammatory activity of the steroid. However, the presence of a halogen atom, particularly fluorine, at the 9-position is often associated with undesired side-effects, such as salt and/or water retention, although such side-effects are, to some extent at least, reduced by further substitution of the molecule, e.g. by a methyl group at the 16-position. Nonetheless there appears to be a growing demand for anti-inflammatory steroids which do not possess a halogen atom at the 9-position, but which still exhibit a satisfactory level of anti-inflammatory activity for the effective treatment of inflammatory conditions. Anti-inflammatory steroids of this type, while of particular interest for topical application, are also of interest for internal administration.

We have now discovered a narrow class of 17-acyloxypregnane steroids not containing a halogen substituent but still exhibiting good anti-inflammatory activity. While our new compounds are of particular value for the topical treatment of inflammations they are also useful for internal administration in the treatment of, for example, rheumatic and arthritic conditions.

The new class of steroids of this invention are certain 17α-monoesters and 17α,21-diesters of 17α,21-dihydroxy compounds of the pregnane series, characterised inter alia by a double bond in the 8(9)-position. Thus, our new compounds are compounds of the general formula

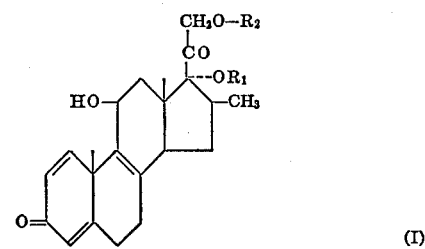

wherein
$R_1$ represents an alkanoyl group containing 3 or 4 carbon atoms, and
$R_2$ represents a hydrogen atom or an alkanoyl group containing 2, 3 or 4 carbon atoms.

The group $R_1$ in formula I above is a propionyl, n-butyryl or isobutyryl group while $R_2$ is a hydrogen atom or an acetyl, propionyl, n-butyryl, or isobutyryl group. Particularly preferred compounds of formula I on account of their good topical anti-inflammatory activity include:

Δ[8(9)]-16β-methyl-prednisolone 17-propionate
Δ[8(9)]-16β-methyl prednisolone 17-n-butyrate
Δ[8(9)]-16βmethyl-prednisolone 17-propionate-21-acetate
Δ[8(9)]-16β-methyl-prednisolone 17 - propionate-21-propionate
Δ[8(9)]-16β-methyl-prednisolone 17-n-butyrate-21-acetate The above-defined compounds of formula I may be advantageously prepared by dehydrohalogenation of a compound of formula

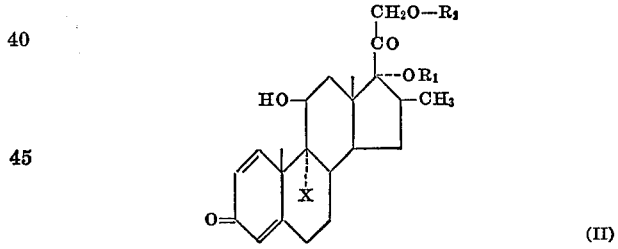

(wherein $R_1$ and $R_2$ are as defined above and X represents a chlorine or bromine atom, preferably a bromine atom) whereby the required Δ[8]-steroid is obtained. This reaction may, in general, be effected under generally mild conditions, for example, using a nitrogen-containing Lewis base such as collidine, pyridine, N-methyl-morpholine, triethylamine and/or a di-lower alkyl lower acylamide, e.g. N,N-dimethyl-formamide or N,N-dimethyl-acetamide, preferably in the presence of an alkali metal or alkaline earth metal carbonate, e.g. sodium or calcium carbonate.

The reaction is for example very conveniently effected using sodium or calcium carbonate in dimethylacetamide. In such amide systems, a halide salt, e.g. an alkali metal or alkaline earth metal halide (e.g. chloride or bromide) for example a lithium, sodium or calcium halide, preferably lithium bromide is advantageously present. In the absence of such a salt a trace of water may be desirable. The reaction is conveniently carried out at an elevated temperature of from 80° to the boiling point of the medium, for example about 100° C. for amide reactants and about 170° C. for tertiary organic bases such as collidine, etc.

The above compounds of formula II may be prepared for example by addition of the elements of hypohalous acid to a compound of formula

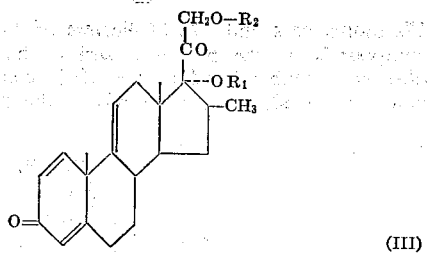

(wherein $R_1$ and $R_2$ are as defined above) advantageously by a process analogous to that described in British specification No. 1,139,506.

Thus, the compound of formula III is reacted with a halogenating agent supplying positive chlorine or bromine, in the presence of a compound supplying $OH^-$ ions. The halogenating agent may be for example an N-chloro- or N-bromo-imide such as N-chlorosuccinimide and N-bromosuccinimide, an N-bromoamide such as N-bromoacetamide or an N-chloro- or N-bromo-hydantoin such as 1,3-dibromo-5,5-dimethyl-hydantoin. The above-mentioned compound supplying $OH^-$ ions may be provided by water, the reaction thus being carried out in an aqueous medium preferably containing a water-miscible organic solvent for the steroid, e.g. tetrahydrofuran or dioxan. The above reaction is also preferably carried out in the presence of an acid, e.g. perchloric or sulphuric acid.

The 17-monoester compounds of formula I may alternatively be prepared from the corresponding 17,21-dihydroxy compounds via the 17,21-orthoesters, e.g. according to the processes described in British patent specifications Nos. 1,043,347 and 1,047,518.

Thus, the 17,21-dihydroxy compound may be first reacted under anhydrous conditions with an orthoester of propionic, butyric or isobutyric acid, e.g. having the formula $R'C(OR'')_3$ (wherein $R'$ is an ethyl, propyl or isopropyl group and $R''$ is an alkyl group having 1–4 carbon atoms e.g. a methyl or ethyl group), preferably in the presence of an acid catalyst, e.g. p-toluene-sulphonic acid, pyridine hydrochloride or sulphuric acid, and, if desired in a solvent medium preferably in an aprotic solvent such as benzene, dioxan, ether, methylene chloride, ethyl acetate or toluene. The resulting 17,21-orthoester can then be hydrolysed to produce a 17-monoester of formula I, the hydrolysis being preferably carried out in the presence of an acid catalyst in an aqueous medium, e.g. a lower alkanoic acid, e.g. acetic or propionic acid, or a strong mineral acid, e.g. hydrochloric or sulphuric acid, in an aqueous polar solvent comprising for example ethyl acetate, ethers such as dioxan or tetrahydrofuran or ketones such as acetone. The hydrolysis of the orthoester may be advantageously effected for example in a buffered aqueous organic medium having a pH of from 4 to 6, preferably from 4.5 to 5.5. The aqueous organic medium thus comprises a water-miscible organic solvent, e.g. tetrahydrofuran, dioxan or a $C_{1-4}$ alkanol and a buffer system such as hydrochloric acid-sodium citrate; hydrochloric acid-potassium hydrogen phthalate; potassium hydrogen phthalate-sodium hydroxide; or hydrochloric acid-glycine.

The 17,21-diesters of formula I may be prepared by 21-esterification of the corresponding 17-monoester-21-hydroxy compounds of formula I, e.g. by the process described in British patent specification No. 1,047,519. Thus, the said 21-esterification may be effected using an appropriate acid anhydride or acid chloride under basic conditions e.g. in the presence of a tertiary organic base such as pyridine, quinoline, N-methyl-piperidine, N-methyl-morpholine or dimethylaniline; a solvent may be present, e.g. a hydrocarbon or ether solvent such as benzene, toluene, dioxan or tetrahydrofuran.

The above-mentioned $\Delta^8$-17,21-dihydroxy-compound can be prepared for example by 8(9)-dehydrohalogenation of the corresponding 9-halo-compound, preferably the 9-bromo-compound or a 21-monoester thereof, in the latter case subsequently hydrolysing the 21-ester group, e.g. under basic conditions. This dehydrohalogenation can be effected in the manner described above for the preparation of the compounds of formula I from the compounds of formula II.

In the case where a 21-monoester of a $\Delta^8$-17α,21-dihydroxy steroid compound is produced by the last-described dehydrohalogenation process, the resulting 21-monoester can, if desired, be converted directly into the corresponding 17α-monoester in accordance with the process described in our British application No. 37,655/72.

The 17α-mono- and 17α,21-diesters of formulae II and III may be prepared by the above described esterification techniques.

There are also provided pharmaceutical compositions for use in anti-inflammatory therapy, comprising at least one steroid compound of formula I (as defined above), together with one or more pharmaceutical carriers or excipients. Such compositions may be in forms adapted for topical or internal administration.

The active steroid may be formulated into a preparation suitable for topical administration with the aid of a topical vehicle therefor. Examples of various types of preparation for topical administration include ointments, lotions, creams, powders, drops (e.g. eye or ear drops), sprays (e.g. for the nose or throat), suppositories, retention enemas, chewable or suckable tablets or pellets (e.g. for the treatment of aphthous ulcers) and aerosols. Ointments and creams may for example, be formulated with an oily or buffered aqueous (pH about 5.0) base with the addition of suitable thickening and/or gelling agents and/or glycols. Such bases may thus, for example, include water and/or an oil such as liquid paraffin or a vegetable oil such as arachis oil or castor oil, or a glycolic solvent such as propylene glycol or 1,3-butane-diol. Thickening agents which may be used according to the nature of the base include soft paraffin, aluminium stearate, cetostearyl alcohol, polyethylene glycols, woolfat, hydrogenated lanolin and beeswax and/or glyceryl monostearate and/or non-ionic emulsifying agents.

The solubility of the steroid in the ointment or cream may be enhanced by incorporation of an aromatic alcohol such as benzyl alcohol, phenylethyl alcohol or phenoxyethyl alcohol.

Lotions may be formulated with an aqueous or oily base and will in general also include one or more of the following, namely, emulsifying agents, dispersing agents, suspending agents, thickening agents, solvents, colouring agents and perfumes.

Powders may be formed with the aid of any suitable powder base, e.g. talc, lactose or starch. Drops may be formulated with an aqueous base also comprising one or more dispersing agents, suspending agents or solubilising agents, etc.

Spray compositions may for example be formulated as aerosols with the use of a suitable propellant, e.g. dichlorodifluoromethane or trichlorofluoromethane.

The proportion of active compound in the topical compositions according to the invention depends on the precise type of formulations to be prepared but will generally be within the range of from 0.0001% to 5.0% by weight. Generally however for most types of preparations advantageously the proportion used will be within the range of from 0.001% to 0.5% and preferably 0.01% to 0.25%.

Topical preparations may be administered by one or more applications per day to the affected area; over skin areas occlusive dressings may often be used with advantage.

For internal administration the new compounds according to the invention may, for example, be formulated for oral, parenteral or rectal administration. For oral administration, syrups, elixirs, powders and granules may be used which may be formulated in conventional manner. Dosage unit forms are however preferred as described below.

For parenteral administration the compounds may be presented in sterile aqueous or oily vehicles, suitable oily vehicles including arachis oil, olive oil, etc.

Preferred forms of preparation for internal administration are dosage unit forms i.e. presentations in unitary form in which each unit contains a desired dose of the active steroid. Such dosage unit forms contain from 0.01 to 5.0 mg., preferably from 0.05 to 2.0 mg. of the active steroid. For oral administration suitable dosage unit forms include tablets, coated tablets and capsules. For parenteral administration dosage unit forms include sealed ampoules or vials each containing a desired dose of the steroid. Suppositories, which may be prepared for example with conventional commercial suppository base, provide a dosage unit form for rectal administration. Sterile tablet or pellet implants may also be used, e.g. where slow systemic absorption is desired.

The compounds according to the invention may in general be given by internal administration in cases where systemic adreno-cortical therapy is indicated. The daily dose may vary from 0.05 to 10.0 mg. dependent on the condition being treated and the duration of treatment desired.

The compositions according to the invention may also include one or more preservatives or bacteriostatic agents, e.g. methyl hydroxy benzoate, propyl hydroxy benzoate, chlorocresol or benzalkonium chlorides. The compositions according to the invention may also contain other active ingredients such as antimicrobial agents, particularly antibiotics, such as neomycin.

The following Examples illustrate the invention.

All temperatures are in degrees Celsius.

Ultraviolet spectra were determined in ethanol.

Petrol refers to petroleum ether (b.p. 40–60°).

Unless stated otherwise, melting points were determined on a Kofler block and are uncorrected, optical rotations were measured in dioxan at about 1% w./v. concentation, chromatography was carried out on silica gel and organic extract solutions were dried over magnesium sulphate, unless otherwise stated.

PREPARATION 1

21-Acetoxy-11β,17-dihydroxy-16β-methylpregna-1,4,8(9)-triene-3,20-dione

21-Acetoxy - 9α - bromo - 11β,17 - dihydroxy-16β-methylpregna-1,4-diene-3,20-dione (freshly dried to constant weight over phosphorus pentoxide, 2.0 g.), finely divided calcium carbonate (4.0 g.) and dimethylacetamide (100 ml.) were vigorously stirred and refluxed under nitrogen for 25 minutes. The mixture was cooled, solid material was removed by filtration and the filtrate was concentrated to ca. 20 ml. under reduced pressure, then treated with water. The product was extracted with ethyl acetate; the extracts were washed with sodium carbonate solution, then with water until neutral, dried (sodium sulphate) and evaporated in vacuo. The residue (1.525 g., 90%) was dissolved in chloroform and filtered through neutral alumina; the major portion of the filtrate gave a slightly yellow product (1.2 g., 72%) which was recrystallised from chloroform-petrol to give the title compound (700 mg., 42%), m.p. 206–207° $[\alpha]_D + 88°$, $\lambda_{max.}$ 239 nm. ($\epsilon$ 15, 500).

PREPARATION 2

11β,17,21-Trihydroxy-16β-methylpregna-1,4,8(9)-triene-3,20-dione

A stirred solution of 21-acetoxy-11β,17-dihydroxy-16β-methylpregna-1,4,8(9)-triene-3,20-dione (1.25 g.) in dioxan (15 ml.) and methanol (15 ml.) was treated dropwise with a solution of potassium carbonate (414 mg.) in water (1.0 ml.); the stirring was continued under nitrogen for 1 hour. Glacial acetic acid (0.6 ml.) was added and the mixture was concentrated in vacuo to small volume, poured into water and extracted with ethyl acetate. Evaporation of the extracts gave a residue (740 mg.) which was redissolved in ethyl acetate and filtered through a plug of magnesium silicate; the filtrate was evaporated and the residue (600 mg.) was recrystallised from acetone-hexane to give the title compound (400 mg., 35%) m.p. 185–187°, $[\alpha]_D + 54°$, $\lambda_{max.}$ 239 nm. ($\epsilon$ 15,80).

PREPARATION 3

17,21-(1'-Ethoxy-1'-ethylmethylenedioxy)-11β-hydroxy-16β-methylpregna-1,4,8(9)-triene-3,20-dione A solution of 11β,17,21-trihydroxy-16β-methylpregna-1,4,8(9)-triene-3,20-dione (300 mg.) in dioxan (12 ml.) was treated with toluene p-sulphonic acid (20 mg.) and ethyl orthopropionate (0.45 ml.) and the mixture was stirred at room temperature for 25–30 minutes. The mixture was poured into dilute sodium bicarbonate solution (ca. 200 ml.) and the precipitated product (350 mg.) was washed and dried over phosphorus pentoxide. The product was subjected to preparative thin layer chromatography (TLC) in chloroform-acetone (9:1) in the presence of a trace of pyridine to give the title $\Delta^{8(9)}$-11β-ol 17,21-ethyl orthopropionate (200 mg., 60.5%), $\lambda_{max.}$ 240 nm.

($E^{1\%}_{1cm.}$

367); recrystallisation from acetone-hexane gave a sample (60 mg.), m.p. 215°, $[\alpha]_D + 12°$, $\lambda_{max.}$ 239 nm. ($\epsilon$ 15,800).

PREPARATION 4

11β-Hydroxy-17,21-(1'-methoxy-1'-propylmethylenedioxy)-16β-methylpregna-1,4,8(9)-triene-3,20-dione A solution of 11β,17,21-trihydroxy-16β-methylpregna-1,4,8(9)-triene-3,20-dione (1.00 g.) in dry dioxan (50 ml.) was treated with dry toluene p-sulphonic acid (201 mg.) and trimethyl orthobutyrate (1.99 g.) and the mixture was stirred for 35 minutes at room temperature. The mixture was poured into 2% sodium bicarbonate solution (300 ml.) and the product was extracted with chloroform; the extracts were washed with water, dried (MgSO₄), evaporated and the residue was triturated with petrol to give a pale cream solid (943 mg.). Preparative TLC in chloroform-acetone (4:1) gave the title $\Delta^{8(9)}$-11β-ol 17,21-methylorthobutyrate (767 mg., 62%), $\lambda_{max.}$ 239 nm. ($\epsilon$ 15,400).

PREPARATION 5

16β-Methyl-17,21-dipropionyloxypregna-1,4,9(11)-triene-3,20-dione

A solution of 21-hydroxy-16β-methyl-17-propionyloxypregna-1,4,9(11)-triene-3,20-dione (60.0 g.) in dry pyridine (300 ml.) was stirred and treated with propionic anhydride (30 ml.) and the mixture was kept at room temperature for 5¼ hours. The solution was added dropwise to a well stirred mixture of 2 N sulphuric acid (8 l.), water (6 l.) and crushed ice (2 kg.): after being stirred for ca. 20 minutes the precipitate was collected, washed well with water (ca. 3 l.) and dried in vacuo at room temperature to give the title compound as an almost colourless amorphous solid (70.2 g.), $[\alpha]_D + 14°$ (c. 0.99), $\lambda_{max.}$ 236.5 nm. ($\epsilon$ 15,300).

PREPARATION 6

9α-Bromo-11β,21-dihydroxy-16β-methyl-17-propionyloxypregna-1,4-diene-3,20-dione

A solution of 21-hydroxy-16β-methyl-17-propionyloxypregna-1,4,9(11)-triene-3,20-dione (3.0 g.) in tetrahydrofuran (30 ml.) and water (13.5 ml.) was stirred and treated with 60% perchloric acid (0.75 ml.). The mixture was cooled to 10° and treated portionwise with N-bromosuccinimide (1.68 g.) during 2–3 minutes and then kept at room temperature for 2 hours. Solid sodium metabisulphite was added until a negative starch-iodide reaction was obtained and the mixture was poured into water (150 ml.) with cooling and stirring; the product was extracted with chloroform and the combined extracts were washed with water, dried and solvent was removed under reduced pressure to give a very light brown foam (3.91 g.). Crystallisation from acetone-petrol afforded very light brown crystals (2.84 g., 79.4%); recrystallisation of a portion (146 mg.) twice from acetone gave the *title compound* as colourless needles (97 mg.), m.p. 143–145° (decomp.), $[\alpha]_D$ +113°, $\lambda_{max.}$ 240–241 nm. ($\epsilon$ 13,900).

PREPARATION 7

9α-Bromo-11β-hydroxy-16β-methyl-17,21-dipropionyl-oxypregna-1,4-diene-3,20-dione (A) A solution of 16β-methyl-17,21-dipropionyloxy-pregna-1,4,9(11)-triene-3,20-dione (70.2 g.) in tetrahydrofuran (685 ml.) was stirred and cooled in ice while aqueous (3%) perchloric acid (344 ml.) was added dropwise keeping the temperature below 16°. The mixture was then cooled to 11° and 1,3-dibromo-5,5-dimethylhydantoin (27.0 g.) was added portionwise during 15 minutes at 11–16° with good stirring; and the reaction was stirred for 45 minutes. A few portions of solid sodium metabisulphite was added until a negative starch-iodide reaction was obtained; the mixture was cooled in ice and treated dropwise and slowly with water (344 ml.). After 30 minutes the product was collected, sucked free of mother liquors and washed with water to give, after being dried at room temperature *in vacuo* for 2 days, colourless crystals of the *title compound* as a tetrahydrofuran solvate (78.8 g., 87.8%, $[\alpha]_D$+88°, $\lambda_{max.}$ 241 nm. ($\epsilon$ 14,500).

(B) A solution of 9α-bromo-11β,21-dihydroxy-16β-methyl-17-propionyloxypregna-1,4-diene-3,20-dione (2.2 g.) in dry pyridine (44 ml.) was treated with propionic anhydride (4.4 ml.) at room temperature for 1½ hours. hours. The mixture was poured into ice-cooled dilute sulphuric acid to give the *title compound* as an off-white solid (2.35 g., 93%), $\lambda_{max}$ 241 nm.

($E_{1\ cm.}^{1\%}$

EXAMPLE 1

17-Butyryloxy-11β,21-dihydroxy-16β-methylpregna-1,4,8(9)-triene-3,20-dione

The $\Delta^{8(9)}$-11β-ol 17,21-methylorthobutyrate of Preparation 4 (760 mg.) in acetone (25 ml.) and water (5 ml.) was treated with 2N sulphuric acid (0.2 ml.) and stirred for 50 minutes. The mixture was poured into water (300 ml.) to give a pale cream solid (605 mg., 82%). Crystallisation from acetone/hexane gave the *title compound* as colourless needles, m.p. 213–215°, $[\alpha]_D$ +5°, $\lambda_{max.}$ 238–239 nm. ($\epsilon$ 15,900).

EXAMPLE 2

11β,21-Dihydroxy-16β-methyl-17-propionyloxypregna-1,4,8(9)-triene-3,20-dione

In a similar reaction to that described above, the $\Delta^{8(9)}$-11β-ol 17,21-ethylorthopropionate of Preparation 3 (800 mg.) was converted to the title *21-hydroxy-17-propionate* (570 mg., 76%). Crystallisation from acetone gave an analytical sample, m.p. 210–211°, $[\alpha]_D$+21°, $\lambda_{max.}$ 238 nm. ($\epsilon$ 16,800).

EXAMPLE 3

21-Acetoxy-17-butyryloxy-11β-hydroxy-16β-methyl-pregna-1,4-8(9)-triene-3,20-dione 17-Butyryloxy-11β,21-dihydroxy - 16β - methylpregna-1,4-8(9)-triene-3,20-dione (605 mg.) in dry pyridine (20 ml.) was treated with acetic anhydride (0.647 ml.) and stirred for 3 hours at room temperature. The mixture was poured into dilute sulphuric acid (250 ml.) and the product was collected, washed with water and dried to give a solid (637 mg., 96%). The product was recrystallised from ether-acetone to give the *title compound* as colourless needles, m.p. 189–191°, $[\alpha]_D$+6°, $\lambda_{max.}$ 239 nm. ($\epsilon$ 15,900).

EXAMPLE 4

11β-Hydroxy-16β-methyl-17,21-dipropionyloxypregna-1,4,8(9)-triene-3,20-dione

A similar procedure to that described in the preceding experiment was carried out on the 21-hydroxy-17-propionate (300 mg.) using propionyl chloride at 0°. The reaction mixture was poured into water and product was extracted with ethyl acetate, then subjected to preparative TLC in chloroform-acetone (4:1). The *title compound* was recrystallised from ether-petrol: m.p. 176–177°, $[\alpha]_D$ +19° $\lambda_{max.}$ 239 nm. ($\epsilon$ 16,200).

EXAMPLE 5

11β-Hydroxy-16β-methyl-17,21-dipropionyloxypregna-1,4,8(9)-triene-3,20-dione (A) A mixture of 9α-bromo-11β-hydroxy-16β-methyl-17,21 - dipropionyloxypregna - 1,4 - diene - 3,20 - dione ("bromohydrin 17,21-dipropionate")tetrahydrofuran solvate (26.02 g.), finely divided B.P. calcium carbonate (26.0 g.) and dried lithium bromide (2.60 g.) in dimethylacetamide (260 ml.) was stirred and heated on a steam bath for 40 minutes. The mixture was cooled to room temperature, solid material was removed by filtration and washed with a little dimethyl acetamide; the filtrate and washings were added dropwise to well stirred cold water (1300 ml.) to give a pale cream solid (19.80 g., 97.4%) after being washed with water and dried at 40° overnight *in vacuo*. The solid was dissolved in hot methanol (40–50 ml.), and the hot solution was treated with charcoal, filtered rapidly through kieselguhr and concentrated slightly. After being cooled to room temperature quickly then refrigerated overnight, almost colourless crystals (16.73 g., 80.1%) were obtained. A similar recrystallisation without charcoal treatment gave the *title compound* as almost colourless crystals (14.79 g., 70.7%) after being dried at 100° *in vacuo* for 28 hours, $[\alpha]_D$ +11.6° (c. 1.01), m.p. 130–137°, $\gamma_{max.}$ 239.5 nm.

($E_{1\ cm.}^{1\%}$ 316).

(B) The above procedure was applied to chromatographically homogeneous, unsolvated bromohydrin 17,21-dipropionate (1.20 g.) but using twice the amount of calcium carbonate and dimethyl acetamide with reaction time 3 hours, to give the wet crude product. This was dissolved in ether and washed thoroughly with water, dried (charcoal) and evaporated to a pale yellow foam (743 mg., 72%) which was crystallised from a concentrated ether solution to give light-brown needles (497 mg.). Recrystallisation from methanol gave colourless crystals of the *title compound* as a hydrate (after being dried at 100° *in vacuo* $[\alpha]_D$ +11.6°. (Found: C, 67.6, 67.6; H, 7.3, 7.2. $C_{28}H_{36}O_7 3/4H_2O$ [MW 498.1] requires C, 67.5; H, 7.6%). Melting occurred over a range 125–142°; partial resolidification occurred after ca. 5 minutes at 140–150° and a second melting point was noted at 176–177.5°.

(C) The bromohydrin 17,21-dipropionate (1.0 g.) was refluxed with 2,4,6-collidine (2.0 ml.) for 15 minutes. The mixture was diluted with ether (8 ml.) and crystalline collidine hydrobromide (330 mg.) was removed by filtration. Ether was removed from the filtrate and the residue was added to stirred 2N-sulphuric acid (15 ml.) and water (35 ml.). The mixture was extracted with ethyl acetate and the combined extracts were washed with 2N sulphuric acid, saturated sodium bicarbonate, and water dried and evaporated to a brown foam (818 mg.).

Preparative TLC in chloroform gave the major product as a foam (464 mg., 54%) which crystallised from ether to give *title compound* as colourless needles (222 mg., 26%), m.p. 176.0–177.0°, $[\alpha]_D$ +10.8° (c. 1.01), $\gamma_{max.}$ 239.5 nm. ($\epsilon$ 15,900). Concentration of the mother liquors gave a second crop of almost colourless crystals (110 mg., 13%) homogeneous and identical to the first crop on TLC.

(D) A mixture of beclomethasone 17,21-dipropionate (1.0 g.), and dry B.P. calcium carbonate (2.0 g.) in dry dimethyl acetamide (50 ml.) was stirred under dry nitrogen and refluxed for 1.5 hours. Solid material was removed by filtration and washed with a little dimethyl acetamide; the filtrate and washings were concentrated *in vacuo* to 5–10 ml. and water (50 ml.) was added. The product was extracted with ethyl acetate, the extracts were washed with saturated sodium bicarbonate and water, dried and evaporated *in vacuo* to a red-brown foam (940 mg.). Preparative TLC in chloroform (7 runs) gave the major band as a mixture (507 mg.) which was separated by further chromatography on alumina in chloroform-cyclohexane (2:1) into two components. The major component (248 mg., 27%) was crystallised from ether to give colourless crystals (180 mg., 20%) of *title compound*, m.p. 173–175°, $[\alpha]_D$ +9.5° (c. 0.87), $\gamma_{max.}$ 239.5 nm. ($\epsilon$ 15,800).

EXAMPLE 6

21-Acetoxy-11β-hydroxy-16β-methyl-17-propionyloxypregna-1,4,8(9)-triene-3,20-dione A solution of 21-hydroxy-16β-methyl-17-propionyloxypregna-1,4,9(11)-triene-3,20-dione (30.0 g.) in dry pyridine (150 ml.) was stirred and treated with acetic anhydride (15.0 ml.) and the mixture was kept at room temperature for 8 hours then refrigerated overnight. The solution was added dropwise to a well stirred mixture of 2 N sulphuric acid (4 l.) and crushed ice (4 kg.) and the precipitate was collected, washed with water and dried *in vacuo* to give 21-acetoxy-16β-methyl-17-propionyloxypregna-1,4,9(11)-triene-3,20-dione as an almost colourless granular solid (33.08 g., 100%), $\gamma_{max.}$ 237 nm., ($\epsilon$ 15,200).

A solution of the $\Delta^{9(11)}$-21-acetate-17-propionate (10.0 g.) in tetrahydrofuran (100 ml.) was stirred and cooled in ice while aqueous (3%) perchloric acid (50 ml.) was added dropwise keeping the temperature below 16°. The mixture was then cooled to 10° and 1,3-dibromo-5,5-dimethylhydantoin (4.09 g.) was added portionwise during 15 minutes with good stirring. After 45 minutes, a little sodium metabisulphite was added to destroy the excess of hydantoin reagent. The mixture was cooled in ice and treated dropwise with water (50 ml.) to give *21-acetoxy-9α-bromo-11β-hydroxy-16β - methyl - 17 - propionyloxy-pregna-1,4-diene-3,20-dione* as a colourless tetrahydrofuran solvate (11.43 g., 83.5%), $[\alpha]_D$ +84.8° (c. 1.02), $\gamma_{max.}$ 240 nm. ($\epsilon$ 14,500). A portion (538 mg.) was recrystallised from acetone to give an analytical sample, which was not solvated, as colourless prisms (365 mg.), m.p. 165°–170° (decomp.), $[\alpha]_D$ +97.8° (c. 1.06), $\lambda_{max.}$ 240 nm. ($\epsilon$ 14,700).

A mixture of the bromohydrin 21-acetate-17-propionate T.H.F. solvate (9.66 g.), finely divided BP. calcium carbonate (9.66 g.), dried lithium bromide (966 mg.), and dimethylacetamide (96.6 ml.) was stirred mechanically and heated on a steam bath for 1 hour. The mixture was cooled to room temperature, solid material was removed by filtration, washed with a little dimethylacetamide and the filtrate and washings were poured dropwise into well stirred water (483 ml.) to give a very pale yellow solid (6.47 g., 88.7%). Two recrystallisations from methanol gave pale yellow large prisms (4.02 g., 55.1%) of the *title compound*, m.p. 188–194°, $[\alpha]_D$ +9.8° (c. 1.03), $\gamma_{max.}$ 238.5 nm. ($\epsilon$ 16,100).

EXAMPLE 7

11β-Hydroxy-16β-methyl-17,21-dipropionyloxypregna-1,4,8(9)-triene-3,20-dione

A mixture of 9α-bromo-11β-hydroxy-16β-methyl-17,21-dipropionyloxypregna-1,4-diene - 3,20 - dione tetrahydrofuran solvate (42.9 g.), finely divided calcium carbonate (42.9 g.) and lithium bromide (4.3 g.) in dimethylacetamide (429 ml.) was stirred under nitrogen and heated on a steam bath for 45 minutes. The mixture was cooled to room temperature and solid material was removed by filtration through kieselguhr; the filtrate was added dropwise to water (2,145 ml.) with good stirring to give a cream precipitate.

The product was collected by filtration and dried *in vacuo* at 40° to give a very light brown solid (30.5 g.). A portion (10.0 g.) was treated with a small amount of methanol and the mixture was triturated and refrigerated briefly to give very pale yellow crystals (7.77 g.) of the low-melting crystal form of the *title compound*, after being dried at 40° *in vacuo*. Recrystallisation of the low-melting crystal form from acetone-isopropyl ether gave two crops (3.41 g. and 3.94 g.) of small needles, m.p. 176.5–178° and m.p. 174–177° respectively. The two crops were combined and recrystallised further from acetone-isopropyl ether to give almost colourless needles of the *title compound* in its high-melting crystal form as a single crop (5.97 g.), m.p. 175.5–176.5°, $[\alpha]_D$ +10.5° (c. 1.0, dioxan), $\gamma_{max.}$ 239 nm. ($\epsilon$ 15,600).

EXAMPLE 8

11β-Hydroxy-16β-methyl-17, 21-dipropionyloxypregna-1,4,8(9)-triene-3,20-dione

A mixture of 9α-bromo-11β-hydroxy-16β-methyl-17,21-dipropionyloxypregna - 1,4 - diene - 3,20 dione (330 g.), finely divided calcium carbonate (330 g.), dried lithium bromide (330 g.) and triethylamine (3.5 ml., 0.1 mole equivalents) in dimethylacetamide (3.3 l.) was heated on a steam bath for 40 minutes with stirring. The reaction mixture was cooled to room temperature and the solid material removed by filtration. Methylene chloride (3.3 l.) was added to the filtrate and the resulting solution washed with water. The methylene chloride was distilled off under reduced pressure to give an amber gum which was dissolved in cold methanol (3.3 l.). Water (5.0 l.) was added to the methanol solution slowly with efficient stirring. The product was collected by filtration, washed with cold water and dried under vacuum to give an almost white amorphous solid (235.3 g.). The solid was dissolved in hot acetone (110 ml.) and isopropyl ether (660 ml.) was added, the solution was filtered and crystallised with stirring, the product was collected by filtration, washed with isopropyl ether (150 ml.) and dried under vacuum at 70° C. to give the title compound as pale cream crystals in its high melting form (197.3 g.); $\gamma_{max.}$ 238.5 nm.

$E^{1\%}_{1cm.}$

322; m.p. 177–182° C.

The following Examples illustrate pharmaceutical compositions according to the present invention.

Ointment (1):                                Percent w./w.
16β-Methyl-$\Delta^{8(9)}$-prednisolone 17,21 - dipropionate (low melting point form) _____ 0.10
Propylene glycol _____ 5.00
White soft paraffin to 100.

METHOD OF PREPARATION

The steroid was dissolved in the propylene glycol. The white soft paraffin was melted and the propylene glycol added to the molten paraffin when the latter was at 60–

65° C. The mixture was stirred vigorously and cooled to 40° C.

Ointment (2):  Percent w./w.
16β - Methyl - Δ8(9) - prednisolone 17,21 - dipropionate (low melting point form) .... 0.01
Propylene glycol .............................. 2.50
Distilled water ............................... 2.50
Chrolocresol .................................. 0.005
Sodium citrate BP ............................. 0.0035
Citric acid BP ................................ 0.0015
White soft paraffin to 100.

METHOD OF PREPARATION

The steroid and the chlorocresol were dissolved in the propylene glycol. The citric acid and sodium citrate were dissolved in the water which was then added to the propylene glycol mixture. The white soft paraffin was melted and the propylene glycol/water mixture was added to the molten paraffin when the latter was at 60–65° C. The mixture was stirred vigorously and cooled to 40° C.

Ointment (3):  Percent w./w.
16β - methyl - Δ8,9 - prednisolone - 17,21 - dipropionate (low melting form).......... 0.20
Benzyl alcohol................................. 1
White soft paraffin to produce 100 parts by weight.

Dissolve the steroid in the benzyl alcohol. Add this solution to the melted white soft paraffin at 50° C. Stir until cold to give a homogeneous ointment.

The following pharmaceutical compositions, further illustrating the present invention, may also be prepared. The active ingredient may be any of the above-described compounds according to the invention.

Cream:  Percent w./w.
Active ingredient ............................. 0.10
Isopropyl myristate ........................... 25.0
Diethylene glycol monostearate (DEGMS) .... 8.0
Glyceryl monosterate (GMS) .................. 12.0
Cetomacrogol 1000 ............................ 1.0
Propylene glycol .............................. 15.0
Sodium citrate BP ............................. 0.05
Chlorocresol .................................. 0.10
Water to 100.00.

Mix the propylene glycol and water, heat to 65° C. and dissolve the citrates, chlorocresol and the active ingredient (0.06%). Dissolve the remaining active ingredient in the isopropyl myristate (IPM). Melt the DEGMS, GMS and cetomacrogol 1000, add the IMP and heat to 60° C. Mix the two liquid phases and stir with cooling until the cream sets.

Aphthous-ulcer pellets:
Active ingredient (microfine) ................ 0.25
Lactose ........................................ 69.90
Acacia ......................................... 3.00
Magnesium stearate ............................ 0.75

Pass the steroid, lactose and acacia, separately through a No. 60 B.S. mesh sieve blend the powders and granulate with 50% ethanol in water. Pass the mass through a No. 12 mesh sieve and dry the granules at 50° C. Pass the dried granules through a No. 20 mesh B.S. sieve and blend in the magnesium stearate, previously passed through a No. 100 mesh B.S. sieve. Compress in a conventional manner on 7/32 inch diameter punches, to give a pellet that will dissolve slowly in the mouth.

Retention enema:  Percent
Active ingredient (microfine) ......w./v__ 0.0005
Tween 80 ...........................w./v__ 0.05
Ethanol ............................v./v__ 0.015
Methyl p-hydroxy benzoate ..........w./v__ 0.08
Propyl p-hydroxy benzoate ..........w./v__ 0.02
Distilled water to 100 vols.

Heat the available water to 95° C., add the methyl and propyl p-hydroxy benzoates and stir to dissolve. Cool the vehicle to room temperature. Disperse the steroid in the ethanol and add to the Tween 80; warm the mixture to 50° C. and stir until the steroid is in solution. Add the steroid solution to the vehicle, stirring vigorously to avoid precipitation, and make up to volume with water if required. Distribute the enema into plastic bags, e.g. P.V.C. bags for self-administration or into other containers suitable for use.

Eye drops:  Percent
Active ingredient ..................w./v__ 0.025
Tween 80 ...........................w./v__ 2.5
Ethanol ............................w./v__ 0.75
Benzalkonium chloride ..............w./v__ 0.02
Phenyl ethanol .....................v./v__ 0.25
Sodium chloride ....................w./v__ 0.60
Water for injection to 100 volumes.

Dissolve the sodium chloride, benzalkonium chloride and phenyl ethanol in the water for injection. Suspend the steroid in the alcohol and add to the Tween 80. Warm the mixture to 50° C. and stir until dissolved. Add the steroid solution to the eye-drop vehicle with rapid stirring to obtain a clear solution. Sterilise the bulk by filtration through a sintered glass filter and distribute into sterile small well filled, neutral glass eye-drop containers.

Nasal drops:  Percent
Active ingredient ..................w./v__ 0.005
Tween 80 ...........................w./v__ 0.05
Alcohol 95% ........................v./v__ 0.15
Methyl paraben (p-hydroxy benzoate)
                                    w./v__ 0.04
Propyl paraben (p-hydroxy benzoate) w./v__ 0.02
Sodium chloride ....................w./v__ 0.70
Distilled water to 100 volumes.

Dissolve the sodium chloride and the parabens in the distilled water heated to 95° C., and allow the solution to cool. Disperse the steroid in the alcohol and add to the Tween 80. Warm the mixture to 50° C. and stir until solution of the steroid is effected. Add the steroid solution to the vehicle with rapid stirring to obtain a clear solution. Filter the solution free from particulate matter through a sintered glass filter and distribute into small, well filled containers.

Oral tablet:  Mg.
Active ingredient (microfine) ................ 0.5
Lactose ........................................ 175.5
Maize starch (dried) .......................... 20.0
Gelatin ........................................ 2.0
Magnesium stearate ............................ 2.0

Total weight .................................. 200.0

Mill a suspension of 300 mg. of the active ingredient in 2 ml. of water containing 0.1% of Tween 80 for 16 hours in a 10 ml. nylon pot about three quarters filled with steatite balls, until 90% by number of the particles have a diameter of less than 10 microns. Blend the maize starch and lactose, pass through a 60 mesh B.S. sieve and granulate with a 10% solution of gelatin, containing the suspension of the active ingredient and washings from the nylon pot, by passing through a 16 mesh B.S. sieve. Dry the granules at 40° C. overnight, pass through a 20 mesh B.S. sieve, blend with magnesium stearate previously passed through a 100 mesh B.S. sieve and tablet using a tabletting machine having a 5/32 inch flat-bevelled punch.

We claim:
1. A compound of the general formula

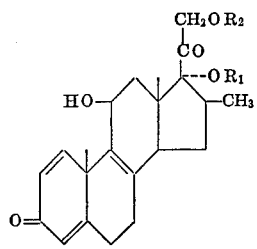

wherein $R_1$ represents an alkanoyl group containing 3 or 4 carbon atoms, and $R_2$ represents a hydrogen atom or an alkanoyl group containing 2, 3 or 4 carbon atoms.

2. A compound according to claim 1 wherein $R_1$ represents a propionyl, n-butyryl or iso-butyryl group.

3. A compound according to claim 1 wherein $R_2$ represents a hydrogen atom or an acetyl, propionyl, n-butyryl or iso-butyryl group.

4. A compound according to claim 1, namely $\Delta^{8(9)}$-16$\beta$-methyl-prednisolone 17-propionate.

5. A compound according to claim 1, namely $\Delta^{8(9)}$-16$\beta$-methyl-prednisolone 17-n-butyrate.

6. A compound according to claim 1, namely $\Delta^{8(9)}$-16$\beta$-methyl-prednisolone 17-propionate-21-acetate.

7. A compound according to claim 1, namely $\Delta^{8(9)}$-16$\beta$-methyl-prednisolone 17-propionate-21-propionate.

8. A compound according to claim 1, namely $\Delta^{8(9)}$-16$\beta$-methyl-prednisolone 17-n-butyrate-21-acetate.

References Cited
UNITED STATES PATENTS
3,282,929   11/1966   Heller et al. _____ 260—239.55

HENRY A. FRENCH, Primary Examiner

U.S. Cl. X.R.

260—239.55 D; 424—243